United States Patent [19]
Markstein et al.

[11] Patent Number: 6,142,416
[45] Date of Patent: *Nov. 7, 2000

[54] HYDRAULIC FAILSAFE SYSTEM AND METHOD FOR AN AXISYMMETRIC VECTORING NOZZLE

[75] Inventors: David J. Markstein, Hamilton; Martin A. Clements, Cincinnati; Robert M. Ausdenmoore, West Chester; William C. Lippmeier, Loveland, all of Ohio

[73] Assignee: General Electric Company, Cincinnati, Ohio

[ * ] Notice: Under 35 U.S.C. 154(b), the term of this patent shall be extended for 610 days.

[21] Appl. No.: 08/818,051

[22] Filed: Mar. 14, 1997

Related U.S. Application Data

[63] Continuation of application No. 08/314,124, Sep. 29, 1994, abandoned.

[51] Int. Cl.[7] .................................................. B63H 11/10
[52] U.S. Cl. ................................ 244/53 R; 239/265.19; 239/265.39; 239/265.33
[58] Field of Search .................. 239/265.19, 265.33, 239/265.37, 265.39, 265.41; 92/15, 17, 20, 28, 23, 62; 74/526; 244/53 R

[56] References Cited

U.S. PATENT DOCUMENTS

| | | | |
|---|---|---|---|
| 1,181,111 | 5/1916 | Carter | 92/23 |
| 2,395,435 | 2/1946 | Thompson et al. . | |
| 2,866,315 | 12/1958 | Schakel | 60/35.6 |
| 2,893,209 | 7/1959 | Colley | 60/97 |
| 3,227,048 | 1/1966 | Criffield et al. | 91/6 |
| 3,322,939 | 5/1967 | Curties et al. | 244/75 R |
| 3,554,084 | 1/1971 | Rasmussen . | |
| 3,612,400 | 10/1971 | Johnson . | |
| 3,806,063 | 4/1974 | Fitzgerald . | |
| 4,000,854 | 1/1977 | Konarski et al. . | |
| 4,030,291 | 6/1977 | Sargisson . | |
| 4,128,208 | 12/1978 | Ryan et al. . | |
| 4,538,504 | 9/1985 | Kast . | |
| 4,704,865 | 11/1987 | Archung . | |
| 4,711,089 | 12/1987 | Archung . | |
| 4,718,647 | 1/1988 | Ludwig . | |
| 4,799,623 | 1/1989 | Bruchez, Jr. et al. . | |
| 4,805,515 | 2/1989 | Kast . | |
| 4,807,517 | 2/1989 | Daeschner . | |
| 4,994,660 | 2/1991 | Hauer . | |
| 5,011,080 | 4/1991 | Barcza et al. . | |
| 5,174,502 | 12/1992 | Lippmeier et al. . | |
| 5,279,107 | 1/1994 | Meisner et al. . | |

FOREIGN PATENT DOCUMENTS

| | | |
|---|---|---|
| 999277 | 12/1945 | France . |
| 2 267 126A | 11/1993 | United Kingdom . |

*Primary Examiner*—Peter M. Poon
*Assistant Examiner*—T. Dinh
*Attorney, Agent, or Firm*—Andrew C. Hess; Rodney M. Young

[57] ABSTRACT

A nozzle failsafe nozzle actuating system for an aircraft gas turbine engine variable exhaust nozzle having a plurality of pivotal flaps circumferentially disposed about a nozzle centerline and bounding an exhaust gas flowpath in the nozzle is provided with a number of primary actuators which are operably connected to nozzle flaps for pivoting and setting an attitude of the flaps relative to the centerline and wherein each of the primary actuators is extendable between a fully extended position and a fully retracted position, and a failsafe nozzle actuating actuator for setting the attitude of each of the flaps to a failsafe attitude during a failsafe mode of the nozzle actuating system wherein the failsafe attitude is such that each of the primary actuators is at a partially retracted position between the fully extended and the fully retracted positions. A particular embodiment provides actuator assembly wherein a failsafe piston rod of the failsafe actuator is disposed concentrically about a primary rod of the primary actuator and a stop element is provided for the failsafe rod to engage the primary rod when the primary rod is being retracted and the failsafe rod is extended.

13 Claims, 5 Drawing Sheets

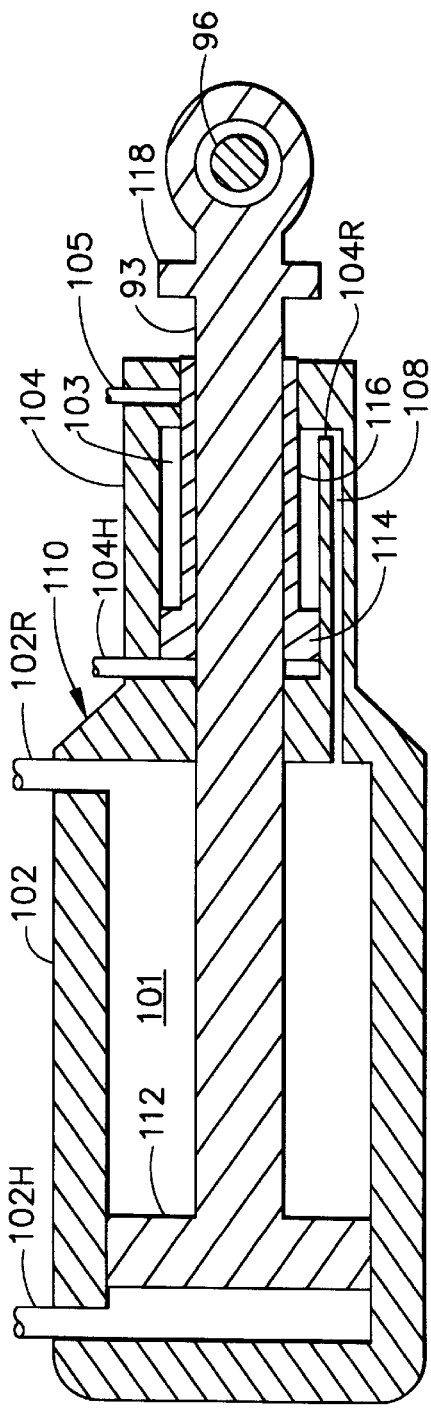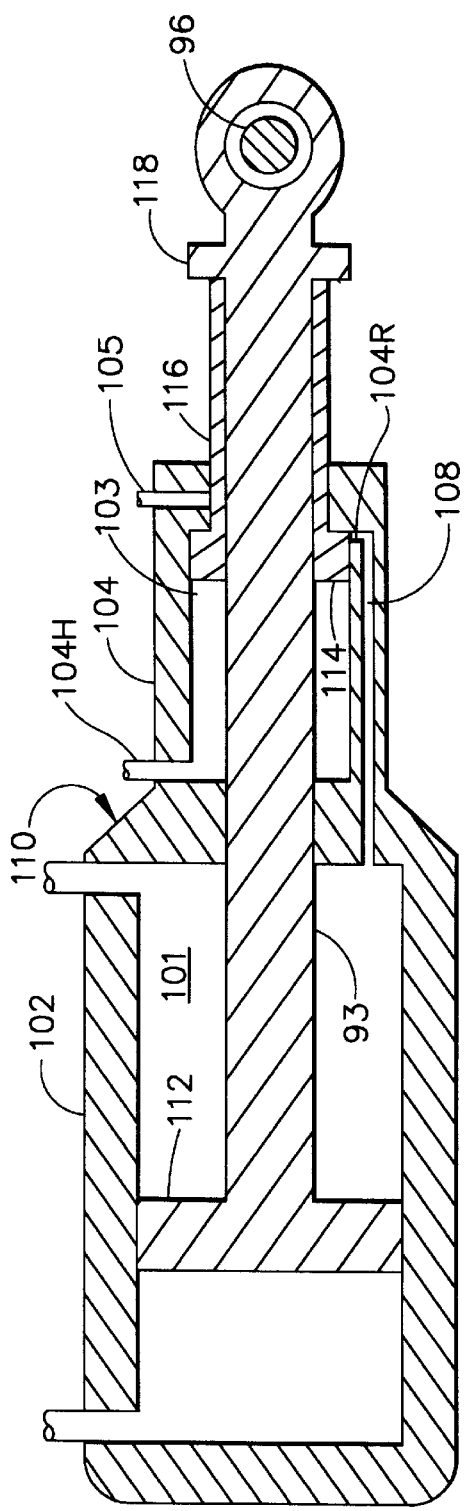

HYDRAULIC FAILSAFE SYSTEM AND METHOD FOR AN AXISYMMETRIC VECTORING NOZZLE

This application is a Continuation of application Ser. No. 08/314,124 filed Sep. 29, 1994.

BACKGROUND OF THE INVENTION

1. Field of the Invention

The present invention relates generally to gas turbine engine axisymmetric vectoring exhaust nozzles and, more particularly, to a failsafe system for the actuating system of such engines.

2. Discussion of the Background Art

Military aircraft designers and engineers constantly strive to increase the maneuverability of the aircraft, both for air to air combat missions and complicated ground attack missions. They have developed thrust vectoring nozzles, which turn or vector the exhaust flow and thrust of the gas turbine engine powering the aircraft, to replace or augment the use of conventional aerodynamic surfaces such as flaps and ailerons. One newly developed thrust vectoring nozzle is an axisymmetric vectoring exhaust nozzle disclosed in U.S. Pat. No. 4,994,660, by Hauer, herein incorporated by reference. The axisymmetric vectoring exhaust nozzle provides a means for vectoring the thrust of an axisymmetric convergent/divergent nozzle by universally pivoting the divergent flaps of the nozzle in an asymmetric fashion or, in other words, pivoting the divergent flaps in radial and tangential directions with respect to the unvectored nozzle centerline. The flaps are pivoted by a vectoring ring which can be axially translated and gimballed or tilted about its horizontal and vertical axis (essentially have its attitude adjusted) through a limited range.

The axisymmetric vectoring exhaust nozzle, as well as more conventional gas turbine engine exhaust nozzles, include primary and secondary exhaust flaps arranged for defining a variable area convergent-divergent exhaust nozzle. The exhaust nozzle is generally axisymmetric or annular and exhaust flow is confined by the primary or convergent flaps and, secondary or divergent flaps being positioned circumferentially adjacent to each other, respectively. The divergent flaps, for example, have a forward end defining a throat of minimum flow area and an aft end having a larger flow area for defining a diverging nozzle extending downstream from the throat. The divergent flaps are variable, which means that the spacing between the divergent flaps as they are moved from a smaller radius position to a larger radius position must necessarily increase. Accordingly, conventional exhaust nozzle seals are suitably secured between adjacent divergent flaps to confine the exhaust flow and prevent leakage of exhaust flow between the divergent flaps.

Vectoring nozzles and, in particular, axisymmetric vectoring exhaust nozzles of the type disclosed in the Hauer reference, provide positionable divergent flaps. These divergent flaps are positionable not only symmetrically relative to a longitudinal centerline of the exhaust nozzle, but may also be positionable asymmetrically relative thereto for obtaining pitch and yaw vectoring. An exemplary thrust vectoring nozzle uses three vectoring actuators to translate and tilt a vectoring ring which in turn forces the divergent flaps in predetermined positions. The vectoring ring tilt angle and tilt direction establish the nozzle's vector angle and vector direction, respectively. Axial translation of the vectoring ring establishes the exit area (often referred to as A9) for a given throat area (often referred to as A8).

Modern multi-mission aircraft application employ engines, such as the GE F110 engine, with convergent/divergent nozzles to meet operational requirements. Convergent/divergent nozzles have, in serial flow relationship, a convergent section, a throat, and a divergent section. Characteristically, these nozzles employ variable area means at both the nozzle throat and at the nozzle exit. This provides a means to maintain a desired exit to throat area ratio, which in turn allows efficient control over the operation of the nozzle. The operation of the nozzle is designed to provide a nozzle exit/throat area (A9/A8) schedule which is optimized for the design cycle of the engine and ideally should provide efficient control at both low subsonic and high supersonic flight conditions. These types of nozzles typically use pneumatic or hydraulic actuators to provide the variable operation. Typically, the exit and throat areas are mechanically coupled to each other in such a manner as to create an area ratio (A9/A8) schedule which is a function of nozzle throat area (A8). The area ratio schedule is typically predetermined to provide efficient engine operation across a wide range of engine conditions but typically optimum performance at specific engine conditions is compromised somewhat in order to provide adequate efficiency throughout the range of engine operation. Thrust vectoring nozzles typically have the ability to independently control nozzle exit area and throat area which allows the engine to achieve a higher level of performance across a wide range of engine operating conditions.

During engine and aircraft operation it is possible for the hydraulic actuating system for the nozzle to fail in any one or more of several modes due to a component malfunction or damage such as due to combat. The failure may be due to a mechanical or control system malfunction which is typically detected by a flight control computer and/or a vector electronic control used for a thrust vectoring nozzle. The nozzle actuating system and nozzle is therefore typically provided with a hydraulic failsafe position using actuating ring actuators to fully retract and in the case of a vectoring ring to set the nozzle in a fixed unvectored position so that thrust of the engine is not vectored. These vectoring actuators are also used to control A9. However the resulting nozzle geometry has a very large area ratio (A9/A8) which impedes opening A8 and therefore augmentor operation and is not aerodynamically optimal. Such a failsafe system is unacceptable. The large area ratio also can cause flow separation of the exhaust plume inside the divergent section of the nozzle. Intermittent separation and reattachment of the flow, particularly in an asymmetric fashion with respect to the engine centerline, could result in an inadvertent vector force. Fully opening the divergent portion of the nozzle results in vastly different nozzle kinematics and opening the throat of the nozzle at this high area ratio could severely damage the nozzle. The inability to open the nozzle throat prevents nominal operation of the engine at ground idle conditions and in the afterburner mode, which could cause the operation of the aircraft to deviate from the norm.

These shortcomings are some of the reasons that there exists a need for a means to provide failsafe mechanism that can rapidly configure the nozzle in a safe operating mode in case of certain types of hydraulic system failure. The failsafe system should operate with a minimal adverse effect on the overall operability of the aircraft and its engine, particularly during combat.

SUMMARY OF THE INVENTION

Briefly, in accordance with one aspect of the present invention, a failsafe nozzle actuating system for an aircraft gas turbine engine variable exhaust nozzle having a DOC. ID plurality of pivotal flaps circumferentially disposed about a nozzle centerline and bounding an exhaust gas flowpath in the nozzle is provided with a number of primary actuators, preferably three, which are operably connected to nozzle flaps for pivoting and setting an attitude of the flaps relative to the centerline. Each of the primary actuators is extendable between a fully extended position and a fully retracted position. The system further includes a failsafe nozzle actuating means for setting the attitude of each of the flaps to a failsafe attitude during a failsafe mode of the nozzle actuating system wherein the failsafe attitude is such that each of the primary actuators is at a partially retracted position between the fully extended position and the fully retracted position and preferably wherein all actuators are extended an equal distance. The failsafe nozzle actuating means preferably includes a number of failsafe actuators, preferably three, each of which is extendable to a failsafe position corresponding to a position for pivoting and setting each of the flaps to a failsafe attitude. A failsafe control system is provided to detect a failsafe condition and to set the flaps at the failsafe attitude during a failsafe mode of the nozzle actuating system. The failsafe attitude of each of the flaps is at an attitude corresponding to each of the primary actuators being at a partially retracted position between the fully extended position and the fully retracted position.

The preferred embodiment has a number of failsafe actuators, preferably three, that are extendable to a failsafe position corresponding to a position between the fully extended position and said fully retracted position of the primary actuators wherein the primary and failsafe actuators include co-annular respective primary and failsafe pistons. One embodiment provides the failsafe pistons with a stop means to meet and engage the primary pistons and set the failsafe position of the primary and failsafe pistons such that the nozzle is placed in a non-vectored nozzle geometry during the hydraulic failsafe mode.

A thrust vectoring nozzle embodiment of the present invention includes differentially pivotable flaps so as to have different attitudes about the nozzle centerline and the primary nozzle actuating means further include an actuating ring connecting the actuators to the flaps. In a more specific embodiment, the flaps are divergent flaps pivotably attached to corresponding ones of convergent flaps at an axial location generally corresponding to a throat of the nozzle and includes a secondary nozzle actuating means for pivoting and setting attitude of convergent flaps to control a throat area at the throat and the primary nozzle actuating means controls an exit area at an exit of the nozzle.

A more particular embodiment of the failsafe control system that monitors the failsafe nozzle system employs a flight control computer (FLCC) and a vector electronic control (VEC) that controls the nozzle vectoring system and its actuators. Upon detection of a problem the FLCC or the VEC will interrupt the signal sent to one of two torque motors which are on the nozzle control valve (NCV) and are mounted in series to supply hydraulic pressure to a mode select valve. Interrupting the signal to either torque motor results in the failsafe operation mode being invoked by causing the spring loaded mode select valve to switch actively controlled actuator hydraulic pressures to regulated "soft push" hydraulic pressures. This causes all of the primary actuator rods to retract and actuates the failsafe actuators which causes the failsafe piston rods to extend and engage the primary actuator piston rods or alternatively the ring at a partially retracted failsafe position of the primary actuator piston rods. All of the primary actuator piston rods are extended an equal distance to a failsafe position between the fully extended position and the fully retracted position thus placing the nozzle in an unvectored condition or geometry. A pilot operated switch is also provided to send an interrupt signal to one of two torque motors to invoke the failsafe mode of the failsafe nozzle actuating system.

The present invention provides advantages over present nozzle designs by providing the capability of bringing a variable exhaust nozzle and in particular a thrust vectoring nozzle to a failsafe mode in response to a failure or malfunction signal in the hydraulic actuating system of the nozzle without causing flow separation of the exhaust plume inside the divergent section of the nozzle and an inadvertent, unwanted, and possibly dangerous vector force. The present invention also has the ability to prevent full opening of the divergent portion of the nozzle which could otherwise result in unscheduled and vastly different and unexpected nozzle kinematics. Furthermore the present invention precludes opening of the nozzle's throat of the nozzle at a high exit/throat area ratio which could severely damage the nozzle. Another advantage of the present invention is that with the nozzle in a hydraulic actuating system failed mode it allows operation of the engine at ground idle conditions and in the afterburner mode more safely which is particularly important under combat conditions.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

FIG. 3 is a cross-sectional view of the combined primary and failsafe actuators of the failsafe nozzle actuating system in FIG. 1 with the failsafe actuator at a fully retracted position.

FIG. 4 is a cross-sectional view of the combined primary and failsafe actuators of the failsafe nozzle actuating system in FIG. 1 with the failsafe actuator at a fully extended position.

DETAILED DESCRIPTION

Figure 1:
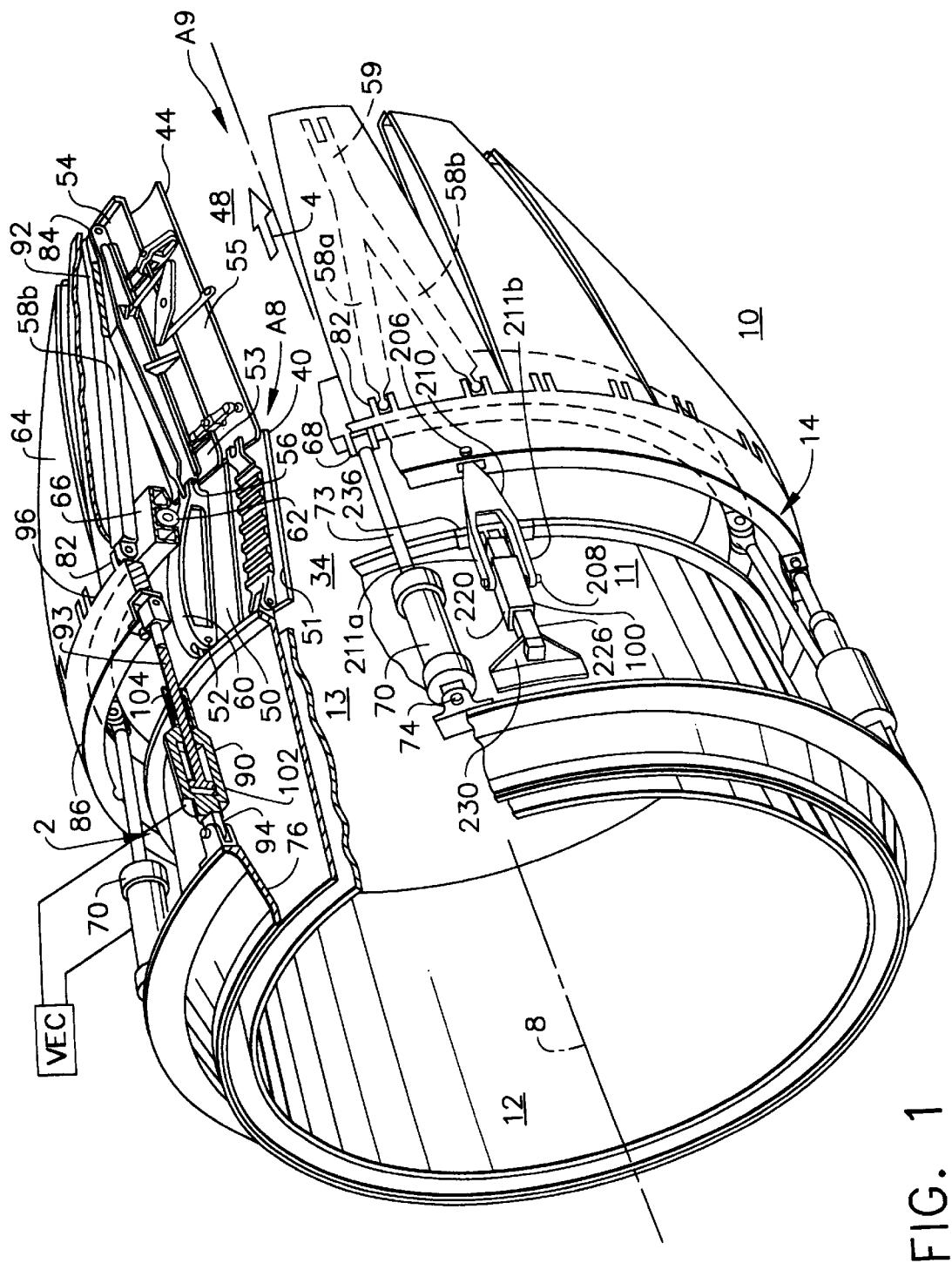
FIG. 1 a perspective view of an axisymmetric vectoring exhaust nozzle having a failsafe nozzle actuating system in accordance with one embodiment of the present invention.

An embodiment of the present invention is illustrated in FIG. 1 as a failsafe nozzle actuating system generally shown at 2 for an axisymmetric thrust vectoring nozzle 14 in an exhaust section 10 of an aircraft gas turbine engine (not shown in its entirety. The exhaust section 10 contains the hot exhaust flow 4 in the exhaust flowpath, is generally circumferentially disposed about an engine centerline 8, and includes, in serial flow relationship, a fixed area duct or engine casing 11, including an afterburner liner 12, and a variable area downstream section 13 of the axisymmetric thrust vectoring nozzle 14 of the convergent/divergent type as referenced previously in the Hauer patent. Referring to FIG. 1, nozzle 14 comprises in serial flow relationship a convergent section 34, a throat 40 and the divergent section 48. The convergent section 34 includes a plurality of convergent or primary flaps 50 circumferentially disposed about the engine centerline 8 with overlapping primary seals 51 disposed between and in sealing engagement with the radially inward facing surface of circumferentially adjacent primary flaps 50. Primary flap 50 is pivotally attached at its forward end to casing 11 by first pivotal or clevis joint 52. The divergent flap 54 is pivotally attached at its forward end 53 to the aft end of the primary flap 50 by a universal two degree of freedom (2 DOF) joint means 56 generally at an axial position in the nozzle 14 which coincides with throat 40. Divergent flaps 54 are generally circumferentially disposed about engine centerline 8 with overlapping secondary or divergent seals 55 disposed between and in sealing engagement with the radially inward facing surface of circumferentially adjacent divergent flaps 54. The divergent seals 55 are designed to seal against the divergent flaps 54 during nozzle operation when the nozzle pressure, the pressure radially inward of the flaps and seals, is normally greater than the pressure outside the nozzle, typically ambient air or nozzle bay pressure. Throat 40 has associated with it a throat area conventionally denoted as A8 and the nozzle exit 44 is generally at the end of divergent flaps 54 and has an exit area associated with it conventionally denoted as A9.

A plurality of cam rollers 62 are disposed in a primary ring 66 which in turn is translated forward and aft by a plurality of first nozzle actuators 70, of which there are four in the preferred embodiment. The variable throat area A8 is controlled by the action of cam roller 62 on the cam surface 60 which is formed on the back of primary flap 50. During operation the high pressure of the exhaust gases within the nozzle force primary flaps 50 and divergent flaps 54 radially outward thus keeping cam surface 60 in contact with one of the cam rollers 62. Radially inner rollers and side rollers (not shown) prevent the primary flaps 50 from uncontrollably moving laterally or inwardly away from the cam roller 62 in the absence of exhaust pressure. A conical annular actuator support 76 is mounted at its narrow forward end to engine casing 11 and first nozzle actuator 70 is pivotally connected to the wide aft end of the actuator support 76 by a universal ball joint 74. First nozzle actuator 70 has an actuator rod 73 which in turn is connected to primary ring 66 by a spherical joint 68.

A plurality of vectoring actuator means 90, of which there are three in the preferred embodiment, are equi-angularly disposed circumferentially around casing 11 and mounted to actuator support 76 by universal ball joints 94 in a similar manner as first nozzle actuators 70. An actuating ring 86 is connected to vectoring actuator means 90 at the aft end of a vectoring actuator rod 93 of the vectoring actuator means by a spherical joint 96. This provides for actuating ring 86 to be axially translated and tilted about centerline 8 in order to control its attitude. Actuating ring 86 controls the positioning or pivoting of divergent flaps 54. Divergent flap 54 is pivotally connected to primary flap 50 by a 2 DOF universal joint means 56 and is pivotally controlled in a multi-degree of freedom manner by a plurality of respective Y-frames 59 having control arms 58a and 58b that operably connect actuating ring 86 to divergent flap 54. Outer flaps 64 are at least partially supported by Y-frames 59 and provide a clean and smooth aerodynamic shape along the exterior of the nozzle.

Control arms 58a and 58b are connected to actuating ring 86 by 3 DOF spherical joints 82 and to the aft end of divergent flap 54 by a spherical joint 84. This linkage is operable to translate an attitude change of actuating ring 86 into a multi-degree of freedom pivoting change or orbital movement of divergent flap 54 whereby each divergent flap may be pivoted through a different angle. The use of spherical joints 82 to attach control arms 58a and 58b provides clevis type pivoting of Y-frame 59 while preventing any twisting loads that may be imparted to either control arms 58a or 58b from being transferred back to actuating ring 86. Backbone 92 provides a mount for divergent flap 54 and support for joints 84 and 56 at its two ends.

Thrust vectoring nozzles vector thrust by positioning the divergent flaps 54 and seals 55 axisymmetrically relative to the centerline 8 therefore the radial and circumferential positions and attitude of the divergent flaps and seals. The actuating vectoring ring 86 is translated and gimballed about nozzle centerline 8 by at least three of the vectoring actuator means 90 and which are also used to translate the vectoring ring to accommodate and/or control the variable exit area A9 and set the exit area to throat area ratio A9/A8. The variable throat area A8 may be independently set by translation of the primary ring 66 by the first actuators 70 to control the engine operating line. The actuating vectoring ring 86 can then be translated axially to maintain a desired exit area to throat area ratio A9/A8. Both sets of actuators and rings may be used in combination to set the throat area A8 and the exit area to throat area ratio A9/A8.

Figure 2:
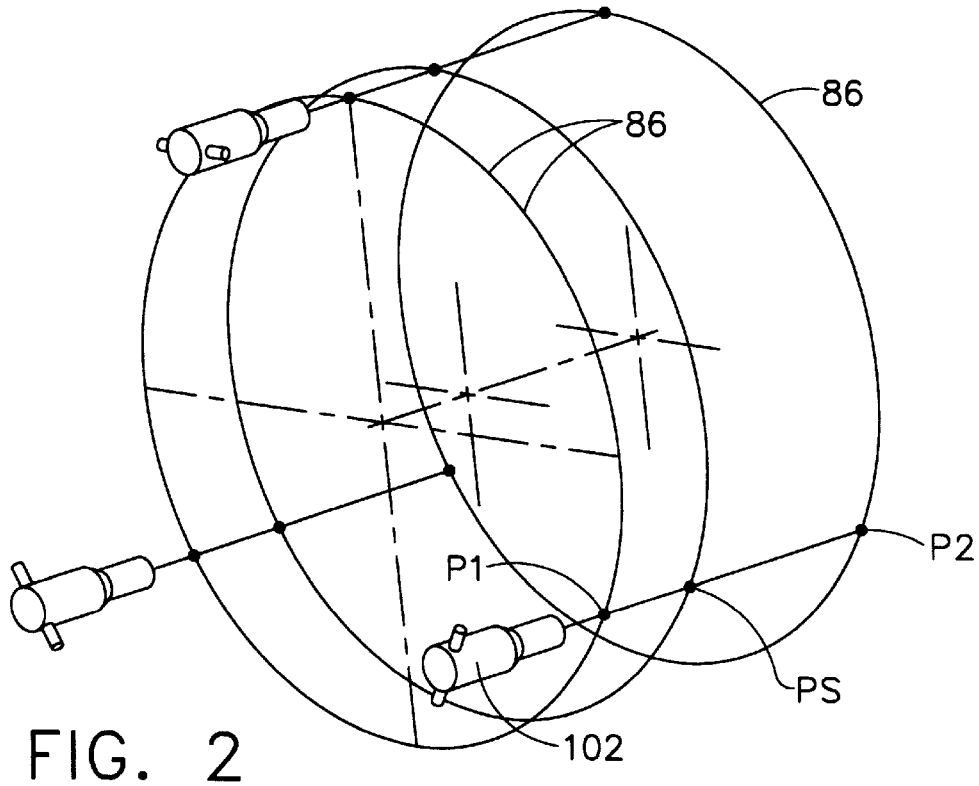
FIG. 2 is a perspective schematic view depicting a failsafe position of the primary and failsafe actuators and actuating ring of the failsafe nozzle actuating system in FIG. 1.
Figure 2A:
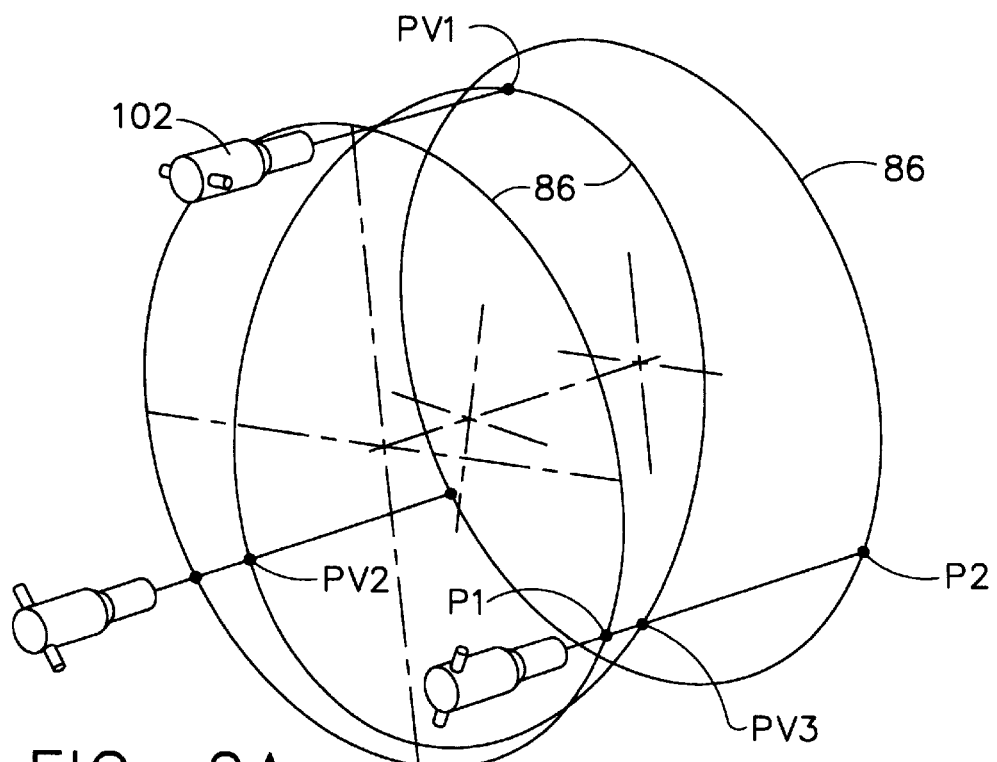
FIG. 2A is a perspective schematic view depicting a vectored position of the primary and failsafe actuators and actuating ring of the failsafe nozzle actuating system in FIG. 1.

The present invention provides a failsafe nozzle actuating system 2 wherein the vectoring actuator means 90 includes a number of primary actuators 102, preferably three, and a preferably like number of failsafe actuators 104 such that when the failsafe nozzle actuating system is placed in a failsafe mode the actuating ring 86 and the primary actuators 102, in the preferred embodiment, are set at a partially retracted failsafe position PS as shown more specifically in FIG. 2. For the purposes of this patent the positions of the actuators are denoted by and generally the same as the position of the actuating ring 86 at the point where the actuating ring is connected to the corresponding actuator. The partially retracted failsafe position PS corresponds to an axial position of the primary actuators 102 between their fully retracted position P1 and their fully extended position P2. In the preferred embodiment the failsafe position is the same for all of the primary actuators 102 which places the actuating ring 86 normal to the centerline 8, and the nozzle and its divergent flaps 54 and divergent seals 55 in an unvectored mode. In one exemplary vectoring nozzle the partially retracted failsafe position PS is about 2.8 inches and the fully extended position P2 is about 4.5 inches. This range of extension is enough to allow about a 20 degree vectoring of the nozzle's exhaust flow 4 in FIG. 1 when the primary actuators 102 are extended differentially as shown in FIG. 2A. The primary actuators 102 are used to pivot the actuating ring 86 for vectoring such that each of the different primary actuators 102 is extended to a different axial position; a forward axial position PV1, a mid axial position PV2, or an aft axial position PV3.

Referring again to FIGS. 1 and 2, the primary actuators 102 are operably connected to nozzle's divergent flaps 54 for pivoting and setting an attitude of the divergent flaps relative to the centerline 8. Each of the primary actuators 102 is extendable between the fully extended position P2 and a fully retracted position P1 independent of any of the other primary actuators for a vectoring nozzle, although there are kinematic limits for vectoring angles and exit area to throat area ratios A9/A8 at different nozzle throat areas A8. The failsafe nozzle actuating system 2 and the method for operating the nozzle also sets the attitude of each of the divergent flaps 54 to a failsafe attitude during a failsafe mode of the nozzle actuating system. The failsafe attitude of the actuating ring 86 and of each of the divergent flaps 54 corresponds to each of the primary actuators 102 being at the partially retracted failsafe position PS between the fully extended position P2 and the fully retracted position P1 of each of the primary actuators. In the preferred embodiment all the primary actuators 102 are extended an equal distance to a failsafe position PS placing the vectoring nozzle 14 in an unvectored geometry or mode during a failsafe mode of the nozzle actuating system.

The exemplary embodiment of the present invention is shown in FIGS. 3 and 4 as having the primary actuator 102 and the failsafe actuator 104 combined in a single actuator housing 110 with a primary piston 112 having a primary piston rod that serves as the vectoring actuator rod 93 in FIG. 1. Also contained in the housing 110 is a failsafe piston 114 having a failsafe piston rod 116 that is concentrically disposed about the vectoring actuator rod 93. The vectoring actuator rod 93 includes an annular flange 118 near its end at which it is connected to the actuating ring 86 by the spherical joint 96. The annular flange 118 is engaged by the failsafe piston rod 116 when the failsafe actuator 104 is actuated thereby operably connecting the failsafe nozzle actuating system 2 to the actuating ring 86 and divergent flaps 54 for pivoting and setting a failsafe attitude of the divergent flaps and the actuating ring during a failsafe mode of operation of the system. When the failsafe actuators 104 are activated and their failsafe piston rods 116 are extended to a failsafe position PS in FIG. 2, they provide a strap means to meet and engage the vectoring actuator rods 93 of the primary pistons 112 and set the failsafe position of the primary pistons such that the nozzle is placed in a fixed nozzle and preferably unvectored geometry during the hydraulic failsafe mode. This type of failsafe actuator 104 is often generically referred to as a reset actuator with a reset piston.

Figure 5:
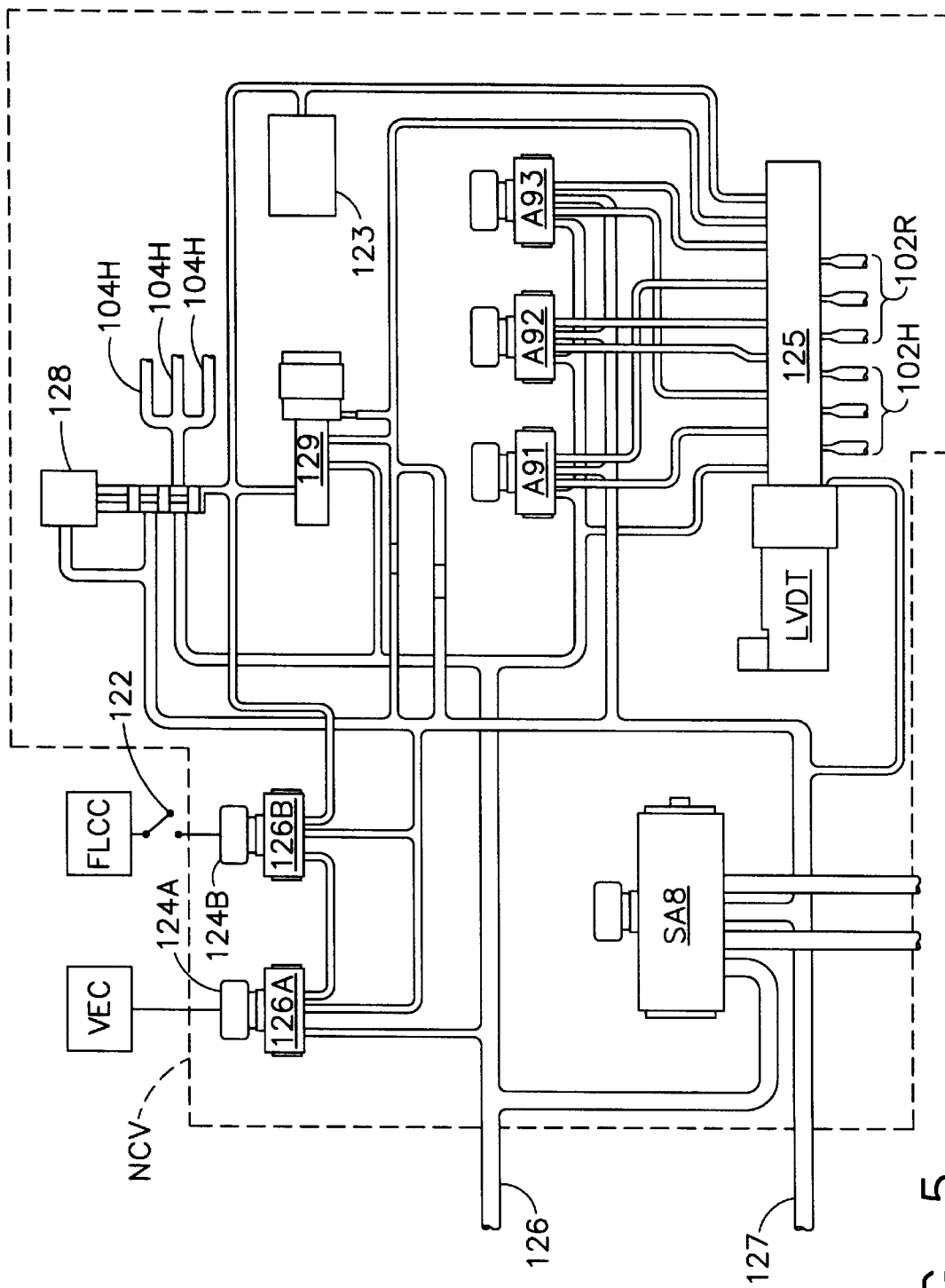
FIG. 5 is a schematic view of the control valves of the control system for the failsafe nozzle actuating system in FIG. 1.

A control system (illustrated in greater detail in FIG. 5) includes a primary head port 102H and a primary rod port 102R in a primary piston chamber 101 in the each of the primary actuators 102. The control system also includes a failsafe head port 104H and a failsafe rod port 104R in a failsafe piston chamber 103 in the each of the failsafe actuators 104. The failsafe rod port 104R is in fluid communication through a interconnecting line 108 with a portion of primary piston chamber 101 that sees the same pressure as the rod side of the primary piston 112 and the hydraulic fluid at primary rod port 102R. A seal drain 105 is provided to drain out hydraulic fluid that may leak past the failsafe piston rod 116. Referring now to FIG. 5, the lines are hydraulic lines through which the control system powers and controls all the actuators. The control system is operably connected to a failsafe signal generating means to invoke the failsafe mode. The exemplary embodiment of the signal generating means illustrated in FIG. 5 includes a flight control computer FLCC, a vector electronic control VEC, and a pilot operated switch 122 located in the cockpit and operated by the pilot. The flight control computer FLCC or the vector electronic control VEC upon sensing a problem with the system, can invoke the failsafe mode. The pilot, using switch 122 can also interrupt the signal from the flight control computer FLCC to invoke the failsafe mode.

A first and second servo-valve, 126A and 126B respectively, on the Nozzle Control Valve (NCV) are mounted in series to supply hydraulic pressure to a mode select valve 125. A pressure switch 123 monitors the pressure in the hydraulic lines. Interrupting a control signal to either a first torque motor 124A of the first servo-valve 126A or a second torque motor 124B of the second servo-valve 126B results in the control system invoking the fail safe mode. The signal may be interrupted independently by the pilot, FLCC or VEC or a combination of these to select the fail safe mode. Upon transfer to failsafe mode, the spring-loaded mode select valve 125 loses pressure from the line connected to the pressure switch 123 and moves linearly cutting off all of the servo controlled pressures from the A91, A92, and A93 torque motors. The mode select valve 125 is a spool valve attached to a linear variable differential transformer LVDT which is used to monitor the position of the spool in the mode select valve. This causes the primary head ports 102H to be connected to return pressure (typically less than 200 psi), the primary rod ports 102R to be connected to the "soft push" regulated pressure (about 900 psi) from the regulator 129, and the failsafe head port 104H to be supplied with full system pressure (about 4400 psi) through a spring loaded switch valve 128 which moves linearly when pressure from servovalve 126B is lost.

This causes all three of the primary actuators 102 in FIG. 1 to retract. Simultaneously the control system sends full system pressure, as supplied by a supply line 126, through the failsafe head ports 104H of the failsafe actuators 104 and their respective failsafe pistons 114 so as to extend the failsafe piston rods 116 and halt all the retracting vectoring actuator rods 93 at a fixed stroke or position (as shown in FIG. 4) resulting in a fixed unvectored nozzle geometry. The pilot operated switch 122 allows the pilot to reconfigure the aircraft to a known engine and flight operation at "the flip of a switch". Note that rod side of the failsafe piston chamber 103 (in FIG. 3) is connected to the rod side of the primary piston chamber 101 through interconnecting line 108 and therefore failsafe piston rod 116 is acted on by pressure at the primary rod port 102R. Therefore, when the system transfers back to the normal mode the pressure at the primary rod port 102R is set greater than the pressure at the failsafe head port 104H and the failsafe piston 114 retracts to allow the primary piston 112 full travel capability.

Note that the hydraulic fluid pressures in the supply line 126 and the return line 127 are used by the servo-valve SA8 to operate the first nozzle actuators 70. The servovalve SA8 provides hydraulic fluid pressures to the head and rod ends of the first nozzle actuators 70 and hence controls the variable throat area A8, as shown in FIG. 1.

There are many preset and preprogrammed conditions that may be used to invoke the failsafe mode and initiate its corresponding failsafe signal. Fault conditions presently contemplated for invoking the failsafe mode include a nozzle throat area A8 feedback fault, a nozzle exit area A9 feedback fault, a nozzle exit area A9 torque motor fault, a vector electronic control VEC power loss, a vector electronic control VEC built in test (BIT) failure and other conditions regarding hardware which are monitored by the vector electronic control VEC. These other conditions include a nozzle exit area A9 electro-hydraulic servo valve failure due to contamination or power loss causing the nozzle exit area A9 to open or close, a vector enable electro-hydraulic servo valve (126A or 126B) failed in the off position (controlled by the airframe or the vector electronic control VEC respectively), a vector enable electro-hydraulic servo valve (126A or 126B) failed in the on position, a failure of the linear differential transformer LVDT in the valve 125, a failure of the pressure switch 123 indicated by a loss of signal to the airframe, or the spring loaded switch valve 128 sticks in the failsafe position so that the normal active mode cannot be entered into by the control system.

Alternate stop means may be used to meet and engage the actuating ring 86 to set the failsafe position of the primary pistons such that the nozzle is placed in a fixed nozzle and preferably unvectored geometry during the failsafe mode. Such an alternate stop means is illustrated in FIG. 6 which provides alternate failsafe actuators 174 that are separate from and spaced circumferentially apart from the primary actuators 102.

Referring back to FIG. 1, actuating ring 86 is supported by three axially adjustable actuating ring support means 100, equi-angularly disposed circumferentially about casing 11, that allows actuating ring 86 to be axially translated and gimballed by vectoring actuator means 90. An axially translating A-frame 210 supports actuating ring 86 by a 3 DOF spherical joint 206. The A-frame 210 is pivotally attached to the slider 220 with a clevis type hinge means 208 in the form of spherical joints at the ends of arms 211*a* and 211*b*. The use of spherical joints at the ends of arms 211*a* and 211*b* provide clevis type pivoting for A-frame 210 and also eliminate the transfer of twisting loads that may be imparted to the arms. The slider 220 is slidable along a hollow slider bar 226 that is attached to engine casing 11 by forward bracket 230 and an aft bracket 236. The actuating ring support means 100 permits the actuating ring 86 to translate axially forward and rearward and tilt so as to change its attitude. A more detailed description of the actuating ring support means 100 may be found in U.S. Pat. No. 5,174,502, by Lippmeier et al., entitled "Support for a Translating Nozzle Vectoring Ring", herein incorporated by reference.

Figure 6:
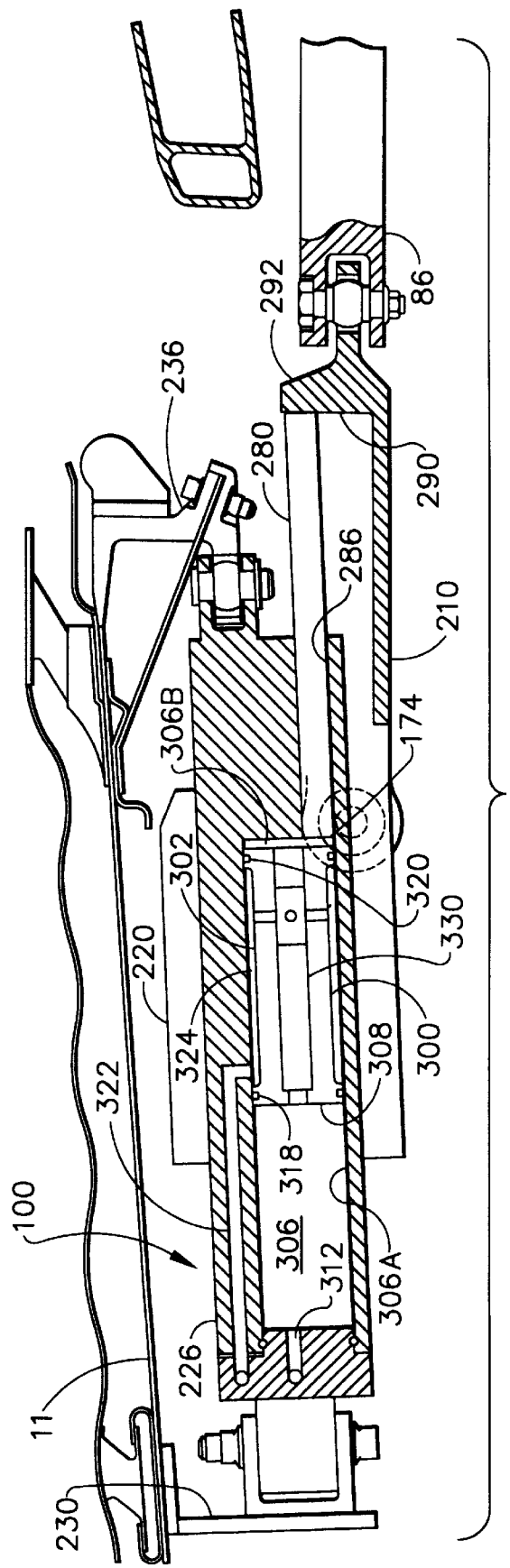
FIG. 6 is a cross-sectional view of an alternate failsafe actuator means for a failsafe nozzle actuating system in accordance with another embodiment of the present invention.

Referring now to FIG. 6, the alternate failsafe actuator 174 is illustrated as being incorporated in the ring support means 100 and as having a stop pin 280 which is free to translate in the axial direction along which the slider bar 226 extends and is restrained from moving in the radial and circumferential directions by a guide hole 286 in the aft end of the slider bar. The stop pin 280 and the guide hole 286 are arranged so that the pin can constantly engage aft face 290 of a flange 292 of the A-frame 210 through the entire angle which the A-frame can pivot relative to the slider 220 and the slider bar 226 that is attached to the engine casing 11 by the forward bracket 230 and the aft bracket 236.

The stop pin 280 is extended by a piston assembly 300 disposed in the slider bar 226 wherein the piston assembly includes a hollow piston cylinder 302 disposed within a piston chamber 306 which in turn is disposed in the slider bar 226. The forward face 308 of the piston cylinder 302 is subject to hydraulic pressure from a forward portion 306A of the piston chamber 306 wherein the pressure is supplied from supply line 126 in FIG. 5 via supply passages 312 in the slider bar during the failsafe mode of operation and is supplied pressure from the return line 127 via the same passages during normal control system operation. The piston cylinder 302 is constructed with forward and aft piston rings 318 and 320, respectively, disposed around the cylinder within respective piston ring grooves and any hydraulic leakage past the piston rings is vented to a drain passage 322 via an inner cavity 324 during all modes of operation. This inner cavity 324 has pressure balanced piston areas and therefore does not contribute to piston force. An aft portion 306B of the piston chamber 306 is vented to ambient pressure. Supply pressure in the forward portion 306A works against ambient pressure in the aft portion 306B which results in translation of the piston assembly 300 aft during the failsafe mode of operation, causing the stop pin 280 to extend with a sufficient level of force required stop the actuating ring 86 from retracting to the fully retracted position P1 in FIG. 2.

During normal control system operation the pressure in the forward portion 306A of the piston chamber 306 is the same as the pressure in the return line 127 in FIG. 5 and is higher than ambient pressure in the aft portion 306B of the piston chamber which creates a force bias to extend the stop pin 280 against the aft face 290 of on the A-frame 210. This force is small relative to the forces acting on the actuating ring support means 100 and its A-frame 210 during normal operation and does not impede translation of the actuating ring 86. Rapid forward movement of the actuating ring 86 could otherwise cause the piston assembly 300 to translate forward rapidly and, during normal control system operation which in turn could cause a sporadic high pressure to develop in the forward portion 306A. To prevent this over pressure condition and the possible resulting impedance of actuating ring 86 travel a pressure relief valve 330 is operably disposed in the piston cylinder 302 to relieve over pressure from the forward portion 306A of the piston chamber 306 to the inner cavity 324 through passages in the piston cylinder.

Leakage of hydraulic fluid from the piston assembly 300 is minimized by the forward and aft piston rings 318 and 320 at the forward and aft edges, respectively, of the piston cylinder 302. The forward piston ring 318 creates a seal between the forward portion 306A of the piston chamber 306 and the inner cavity 324. Since a high differential pressure exists between these two cavities some leakage past the forward piston ring 318 is likely. This leakage will drain from the inner cavity 324 through the drain passages 322. The aft piston ring 320 completes the seal of the inner cavity 324. Any hydraulic oil that does leak into the aft portion 306B of the piston chamber 306 will drain to atmosphere via the guide hole 286.

While the preferred embodiment of our invention has been described fully in order to explain its principles, it is understood that various modifications or alterations may be made to the preferred embodiment without departing from the scope of the invention as set forth in the appended claims.

What is claimed is:

1. A failsafe nozzle actuating system for an aircraft gas turbine engine comprising:

a variable thrust vectoring axisymmetric exhaust nozzle having a plurality of multi-degree of freedom pivotal flaps circumferentially disposed about a nozzle centerline and bounding an exhaust gas flowpath in said nozzle, said pivotal flaps being differentially pivotal so as to have different attitudes about said nozzle centerline in a vectored configuration of said nozzle, a primary nozzle actuating means operably connected to said flaps for pivoting and setting an attitude for each of said flaps relative to the centerline, said primary nozzle actuating means including primary actuators, each of said actuators being extendable independent of any other of said primary actuators between a fully extended position and a fully retracted position, a failsafe nozzle actuating means operably connected to said flaps for pivoting and setting a failsafe attitude of said flaps, said failsafe nozzle actuating means including failsafe actuators each of which is extendable to a failsafe position corresponding to a position for pivoting and setting each of said flaps to a failsafe attitude, and a failsafe control system operable to set said flaps at said failsafe attitude during a failsafe mode of said nozzle actuating system wherein said failsafe attitude of each of said flaps is one at which each of said primary actuators is at a partially retracted position between said fully extended position and said fully retracted position of said primary actuators.

2. A failsafe nozzle actuating system as claimed in claim 1 wherein each of said failsafe actuators is extendable to a failsafe position corresponding to a position between said fully extended position and said fully retracted position of said primary actuators for pivoting and setting each of the flaps to a failsafe attitude and said failsafe control system is operable to set said failsafe actuators to said partially retracted failsafe position.

3. A failsafe nozzle actuating system as claimed in claim 2 wherein said primary and failsafe actuators include primary and failsafe pistons having primary and failsafe piston rods respectively, wherein said primary and failsafe piston rods are co-annular.

4. A failsafe nozzle actuating system as claimed in claim 3 wherein said primary nozzle actuating means further includes an actuating ring connected by joints to said primary actuators so that said actuating ring is axially translatable and tiltable about said centerline and a linkage from said actuating ring to said flaps that translates an attitude change of said actuating ring into a multi-degree of freedom pivoting change of said flaps.

5. A failsafe nozzle actuating system as claimed in claim 2 wherein the flaps are divergent flaps pivotably attached to corresponding ones of convergent flaps at an axial location generally corresponding to a throat of the nozzle.

6. A failsafe nozzle actuating system as claimed in claim 5 further comprising a secondary nozzle actuating means for pivoting and setting attitude of a plurality of convergent flaps to control a throat area at said throat and wherein said primary nozzle actuating means controls an exit area at an exit of the nozzle.

7. A failsafe nozzle actuating system as claimed in claim 6 wherein said primary nozzle actuating means further include an actuating ring connected by joints to said primary actuators so that said actuating ring is axially translatable and tiltable about said centerline and a linkage from said actuating ring to said flaps that translates an attitude change of said actuating ring into a multi-degree of freedom pivoting change of said flaps.

8. A failsafe nozzle actuating system as claimed in claim 7 wherein said primary and failsafe actuators include corresponding pistons having primary and failsafe piston rods respectively, wherein said primary and failsafe piston rods are co-annular, and said piston rods include a stop means for said failsafe piston rod to engage said primary piston rod and set said failsafe position of said primary and failsafe actuators such that the nozzle is placed in a fixed unvectored nozzle geometry during said hydraulic failsafe mode.

9. A failsafe nozzle actuating system as claimed in claim 8 wherein said failsafe actuating means is operably connected to a failsafe signal generating means to invoke said failsafe mode and said failsafe signal generating means includes at least one of a plurality of failsafe signal generating means said plurality of failsafe signal generating means comprising a flight control computer, a vector electronic control, and a pilot operated switch means for sending a failsafe signal to invoke said failsafe mode.

10. A method for operating a failsafe nozzle actuating system for an aircraft gas turbine engine variable thrust vectoring axisymmetric exhaust nozzle, said method comprising the following steps;

setting different attitudes relative to the centerline for each of a plurality of multi-degree of freedom pivotal flaps circumferentially disposed about a nozzle centerline and bounding an exhaust gas flowpath in the nozzle wherein the pivotal flaps are differentially pivotal so as to have different attitudes about said nozzle centerline in a vectored configuration of said nozzle, setting the attitudes by pivoting the flaps using a number of primary actuators each of which is extendable between a fully extended position and a fully retracted position, and failsafing the nozzle by setting the primary actuators to a failsafe position corresponding to a position for pivoting and setting each of the flaps to a failsafe attitude wherein the failsafe attitude of each of the flaps is one at which each of the primary actuators is extended to a partially retracted position between the fully extended position and the fully retracted position of the primary actuators.

11. A method as claimed in claim 10 wherein the step of failsafing the nozzle includes extending pistons of a secondary number of actuators that are operably connected to the flaps.

12. A method as claimed in claim 10 wherein the step of failsafing the nozzle includes extending pistons of a secondary number of actuators to engage pistons of the primary actuators that are operably connected to the flaps.

13. A method as claimed in claim 10 wherein the step of positioning the flaps includes axially moving and setting the attitude of an actuating ring perpendicular to the nozzle's unvectored centerline wherein the actuating ring is operably connected to pistons of the primary actuators and to the flaps for setting the attitude of the flaps.

* * * * *